Feb. 16, 1965  F. E. BUSCHBOM  3,169,798
SILO UNLOADER DRIVE HUB ATTACHMENT
Original Filed July 5, 1961  2 Sheets-Sheet 1

INVENTOR.
FLOYD E. BUSCHBOM
BY Moore, White & Burd
ATTORNEYS

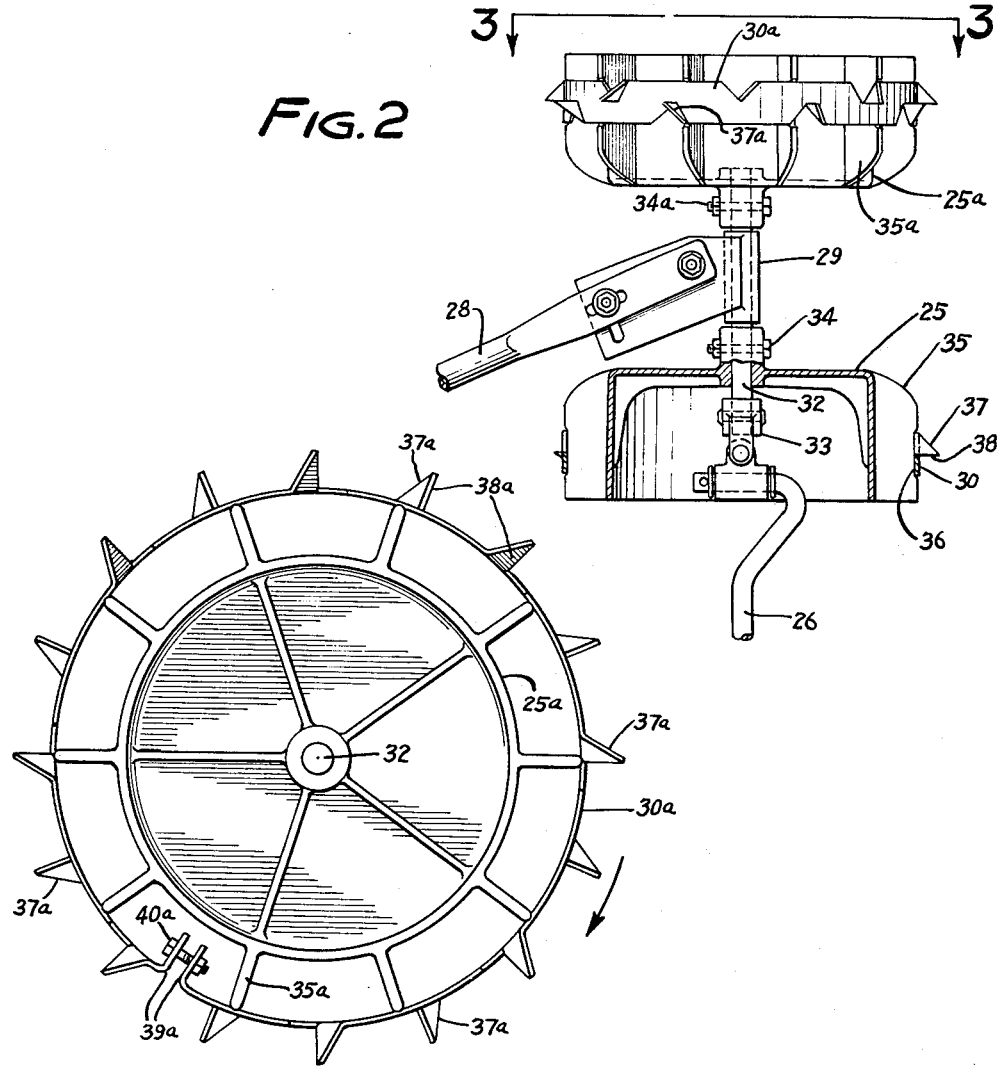

US PATENT 3,169,798 — Patented Feb. 16, 1965

3,169,798
SILO UNLOADER DRIVE HUB ATTACHMENT
Floyd E. Buschbom, Long Lake, Minn., assignor to Vandale Corporation, Long Lake, Minn., a corporation of Minnesota
Continuation of application Ser. No. 121,961, July 5, 1961. This application Jan. 16, 1964, Ser. No. 340,587
2 Claims. (Cl. 301—43)

This is a continuation of application Serial No. 121,961 filed July 5, 1961, now abandoned, for Silo Unloader Drive Hub Attachment.

This invention is a novel drive hub attachment for use on drive hubs of a silo unloader or the like which hubs engage the surface of ensilage or forage material in order to move the silo unloader used therewith over the surface thereof and particularly when the material is very hard, as when frozen. This drive hub attachment invention is primarily adapted for use with silo unloader drive hubs wherein a drive hub is used to propel the unloader over the surface of ensilage in a silo.

Accordingly, it is an object of this invention to provide a novel drive hub attachment for improving the performance of the drive hub on frozen ensilage or the like.

It is a further object of this invention to provide a novel drive hub attachment that may be secured to and removed from the drive hub quickly and easily.

Yet another object of this invention is to provide a drive hub attachment that may be manufactured inexpensively and sold at a low price.

It is still a further object of this invention to provide a drive hub attachment which provides a band with sharp traction points thereon which band can be clamped on or removed from the drive hub quickly and easily and provides an attachment that provides additional traction for the hub.

It is a further object of this invention to provide a drive hub attachment that is not only quickly and easily secured to the drive hub but incorporates simple and effective positive drive means between the hub and the attachment to assure positive driving action of the attachment.

Specifically it is an object of this invention to provide a drive hub attachment for silo unloading mechanisms that can be quickly and easily secured to the drive hubs thereof to provide required traction during periods when the ensilage being unloaded by the mechanism is frozen.

Other and further objects of the invention are those inherent and apparent in the apparatus as described, pictured and claimed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention will be described with reference to the drawings in which corresponding numerals refer to the same parts and in which:

FIGURE 2 is an enlarged plan view of the drive hub assembly, one of which is shown in horizontal section to illustrate its construction more fully; and FIGURE 3 is a still further enlarged end elevation of one of the drive hubs shown in FIGURE 2, taken on the line 3—3 of FIGURE 2.

Figure 1:
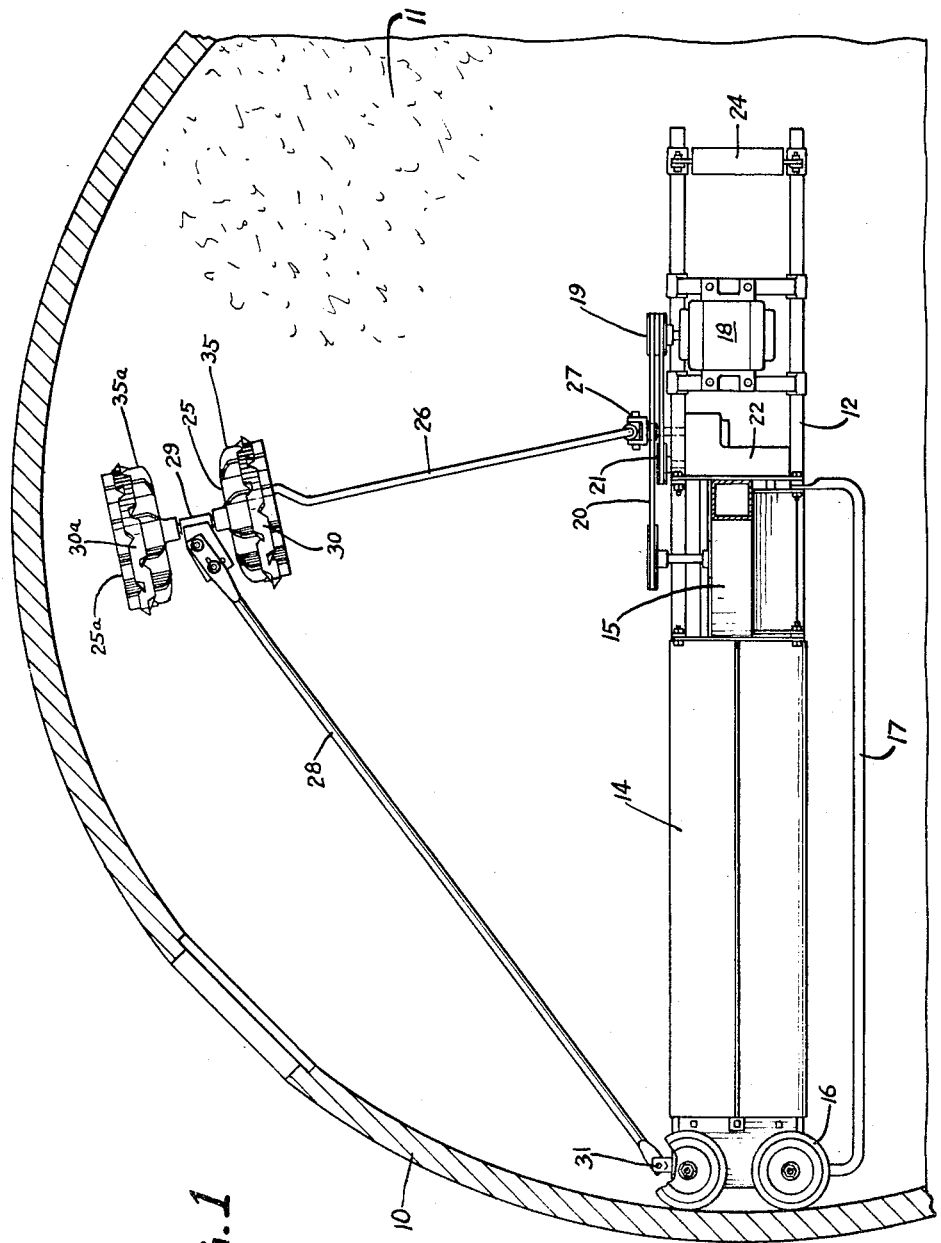
FIGURE 1 is a fragmentary plan view of a silo unloader mechanism in which the drive hubs are equipped with the invention.

Referring first to FIGURE 1, there is shown a fragment of the usual cylindrical silo 10 within which is supported on the surface the ensilage 11, a silo unloader having a frame 12. The frame carries an ensilage collecting arm means 14 and a central discharge impeller mechanism 15 to which the collecting arm means conducts ensilage. Wheels 16 are supported on the frame and guide the end of the means 14 along the silo wall, as the unloader rotates about the silo. An advance guard rail 17 is provided.

A suitable power source such as motor 18 is secured to frame 12 and provides power via a dual sheave 19 to drive the belts 20 and 21 respectively. Belt 20 provides the power connection for impeller 15 while belt 21 via a gear box 22 provides the connection to drive both the collecting arm means 14 and to propel the entire unit about the silo. A counterweight 24 may also be provided. Any suitable structure comparable to that disclosed in United States Patent No. 2,794,560 (hence neither shown nor described herein) may be employed to support a substantial part of the weight of the mechanism through overhead cables.

As the silo unloader structure forms no part of this invention per se, it is not described in detail and reference is made to Patent No. 2,974,560 for further explanation.

Traction to cause the unloader to rotate within the silo is achieved by means of the drive hubs 25 and 25A. A drive shaft 26 is connected by suitable means such as the universal joint 27 to a shaft of the gear box 22. The force generated by rotating drive hubs 25 and 25A is transmitted to the outboard end of the unloader by means of a push rod or tie bar 28 which is connected to a bearing 29 within which the axle for the drive hubs is journalled. Push rod 28 is also secured as at 31 to the outboard end of the collecting arm means 14. Traction attachments 30 and 30A are also seen secured to the drive hubs 25 and 25A in FIGURE 1.

Turning now to FIGURE 2, drive shaft 26 is seen to be connected to a hub axle 32 through suitable means such as universal joint 33. Drive hubs 25 and 25A are suitably secured to the axle as to be rotated therewith by any suitable means as the nut and bolt assemblies 34 and 34A. The drive hubs themselves are provided with ensilage engaging paddles or fins as at 35 and 35A. Drive hub 25 which is shown in section illustrates how the paddles or fins 35 and 35A may be provided with slight indentations as shown at 36 within which the attachment band 30 may fit if desired, although such indentations may be omitted if desired.

As is seen most clearly in FIGURE 2 with respect to attachment band 30A the band is partially cut on alternate sides at an angle relative to the edge of approximately 45° and the metal of the band adjacent the cut bent up to form gripping teeth 37A and 37 in the case of band 30. The teeth 37A and 37 are arranged so that all of their straight edges as at 38A in FIGURE 3 will be pointing in the same direction. For this reason, appropriate arrangement of the bands 30 and 30A on their respective drive hubs 25 and 25A will cause all of the straight edges 38 and 38A to be facing in the direction of rotation of the hub as it drives the unloader around the silo. Teeth 37 and 37A are able to penetrate any extremely hard or frozen material in a satisfactory manner both because they are formed with a sharp point and because they are made from relatively thin material. They, therefore, penetrate a relatively hard surface without tremendous force being applied to cause them to do so. Since the teeth 37A work against a relatively hard surface and need not have broad material engaging surfaces in order to provide traction for the drive hubs, they may be kept short so that their strength is adequate even though made of comparatively thin material.

FIGURE 3 also illustrates most satisfactory the clamping flanges 39A which, by means of a suitable variable length clamping means such as the nut and bolt assembly 40A, may be used to draw the band 30A tightly about the drive hub 25A. A similar structure is provided for band 30. By placing clamping flanges 39A on the inside of the band 30A, a positive stop or projection is provided which can engage the paddles 35A so that even if the band 30A is not clamped tightly enough on the hub 25A to keep it from slipping a little when torque applied is maximum, it cannot slip farther than paddle 35A since the clamping mechanism 39A–40A will engage the paddle 35A and thereafter positive torque will be applied. The bands are easily removed when not needed by simply loosening bolt assembly 40A until there is sufficient expansion of the diameter of band 30A (and similarly with band 30) to allow it to be slipped laterally from the drive hub.

The inward turning of flanges 39A insures that they will not disturb the action of the band and of its gripping teeth.

It is apparent that many modifications and variations of this invention as hereinbefore set forth may be made without departing from the spirit and scope thereof. The specific embodiments described are given by way of example only and the invention is limited only by the terms of the appended claims.

I claim:

1. In combination with a silo drive hub equipped with radially extending paddles, an attachment for increasing the traction of said drive hubs at times comprising: a band of sheet metal, diagonal cuts extending alternately from opposite edges of said band of sheet metal from the edges toward the center thereof at an angle of forty-five degrees with respect to the edges of said band of sheet metal, the metal between the cuts and the edge of the band bent outward to form teeth, said band of sheet metal being generally shaped to conform to the periphery of said powered drive hub paddle ends, each of said paddle ends having a slight central depression therein to receive said band of sheet metal, the ends of said band of sheet metal being bent inward and perforated, a threaded means extending through said perforations, whereby said band of sheet metal may be clamped about said drive hub of said silo unloader with said traction teeth extending radially outward therefrom and the ends of said band of sheet metal extend into the space between said radially extending paddles, said band being less than one-half as wide as said paddles extend axially, and said bands centered axially on said paddles.

2. In combination with a silo unloader drive hub having radially extending regularly spaced paddles, a traction increasing device comprising a band of sheet metal shaped to encircle the periphery of said drive hub paddle ends as a group, said band being longer than said periphery and having its ends bent to extend radially inward between two of said paddles, means secured to said band ends for drawing them together to clamp said band about said drive hub, said band being substantially narrower than said paddles axially, teeth formed on said band by making diagonal cuts in said band extending from a leading to a trailing point on said band relative to the rotation of said drive hub from the band side edges toward its longitudinal center line and the material of the band adjacent said cuts bent to extend radially outward from the band to form said teeth, said teeth having trailing edges slanting from the teeth points down to said band against the direction of rotation of said drive hub and the leading edges of said teeth extending radially with respect to said drive hub.

References Cited in the file of this patent

FOREIGN PATENTS 296,637 Great Britain _____ Sept. 6, 1928

UNITED STATES PATENT OFFICE
CERTIFICATE OF CORRECTION

Patent No. 3,169,798              February 16, 1965

Floyd E. Buschbom

It is hereby certified that error appears in the above numbered patent requiring correction and that the said Letters Patent should read as corrected below.

Column 2, line 25, for "2,974,560" read -- 2,794,560 --.

Signed and sealed this 13th day of July 1965.

(SEAL)
Attest:

ERNEST W. SWIDER
Attesting Officer

EDWARD J. BRENNER
Commissioner of Patents